United States Patent
Tran et al.

(10) Patent No.: US 11,662,958 B2
(45) Date of Patent: May 30, 2023

(54) SYSTEM AND METHOD FOR IDENTIFICATION AND LOCATION OF USER IDENTIFIED FEATURE SPECIFIC PRINTERS

(71) Applicant: Toshiba TEC Kabushiki Kaisha, Shinagawa-ku (JP)

(72) Inventors: Phi Tran, Westminster, CA (US); Ngoc Nguyen, Santa Ana, CA (US); William Tang, Covina, CA (US)

(73) Assignee: Toshiba TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/476,760

(22) Filed: Sep. 16, 2021

(65) Prior Publication Data
US 2022/0004345 A1    Jan. 6, 2022

Related U.S. Application Data

(63) Continuation of application No. 16/797,179, filed on Feb. 21, 2020, now Pat. No. 11,150,848.

(51) Int. Cl.
*G06F 3/12*    (2006.01)
*G01C 21/20*    (2006.01)

(52) U.S. Cl.
CPC ......... *G06F 3/1204* (2013.01); *G01C 21/206* (2013.01); *G06F 3/1232* (2013.01); *G06F 3/1292* (2013.01)

(58) Field of Classification Search
None
See application file for complete search history.

(56) References Cited

U.S. PATENT DOCUMENTS

| 2007/0124436 A1* | 5/2007 | Shepherd | G06F 3/1204 709/223 |
| 2007/0208837 A1* | 9/2007 | Tian | G06F 3/1232 709/223 |
| 2012/0019867 A1* | 1/2012 | Prati | G06F 3/1287 358/1.15 |
| 2014/0022587 A1* | 1/2014 | Coccia | G01S 19/14 358/1.15 |

(Continued)

FOREIGN PATENT DOCUMENTS

JP    2015046058 A  *  3/2015  ........... G06F 3/1292

OTHER PUBLICATIONS

English translation of Japanese Patent Application 2013-177256, corresponding to Japanese Publication 2015-046058. (Year: 2013 ).*

*Primary Examiner* — Thomas D Lee
(74) *Attorney, Agent, or Firm* — Ulmer & Berne LLP; John X. Garred

(57) ABSTRACT

A system and method for identification and location of user identified, feature specific printers works in conjunction with a user's smartphone or tablet computer. A user inputs their desired printer features into their device, and a listing of candidate printers within a search perimeter is rendered. A distance between the user device and each candidate printer is calculated from a determined location user device relative to locations of each of the candidate printers. The user selects their desired printer from the candidates, and directions for the user to walk to the selected printer are generated and displayed.

16 Claims, 7 Drawing Sheets

(56) References Cited

U.S. PATENT DOCUMENTS

2014/0344420 A1\* 11/2014 Rjeili .................. G06Q 10/109
709/227
2015/0070725 A1\* 3/2015 Monden ................ G06F 3/1292
358/1.15

\* cited by examiner

SYSTEM AND METHOD FOR IDENTIFICATION AND LOCATION OF USER IDENTIFIED FEATURE SPECIFIC PRINTERS

CROSS-REFERENCE TO RELATED APPLICATIONS

This patent application is a continuation of U.S. patent application Ser. No. 16/797,179 filed on Feb. 21, 2020, the disclosure of which is hereby incorporated by reference herein in its entirety and made part of the present U.S. utility patent application for all purposes.

TECHNICAL FIELD

This application relates generally to printing via portable data devices such as smartphones or tablet computers. The application relates more particularly to identifying to users available printers that meet the user's current needs, and guiding users to a selected printer's location.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs are typically used in networked environments so the devices can be shared by multiple users. Early systems employed user workstations connected to MFPs via a data network. More recently, printing is undertaken in conjunction with wireless networking employing portable user devices such as smartphones and tablets.

BRIEF DESCRIPTION OF THE DRAWINGS

Various embodiments will become better understood with regard to the following description, appended claims and accompanying drawings wherein:

DETAILED DESCRIPTION

Figure 1:
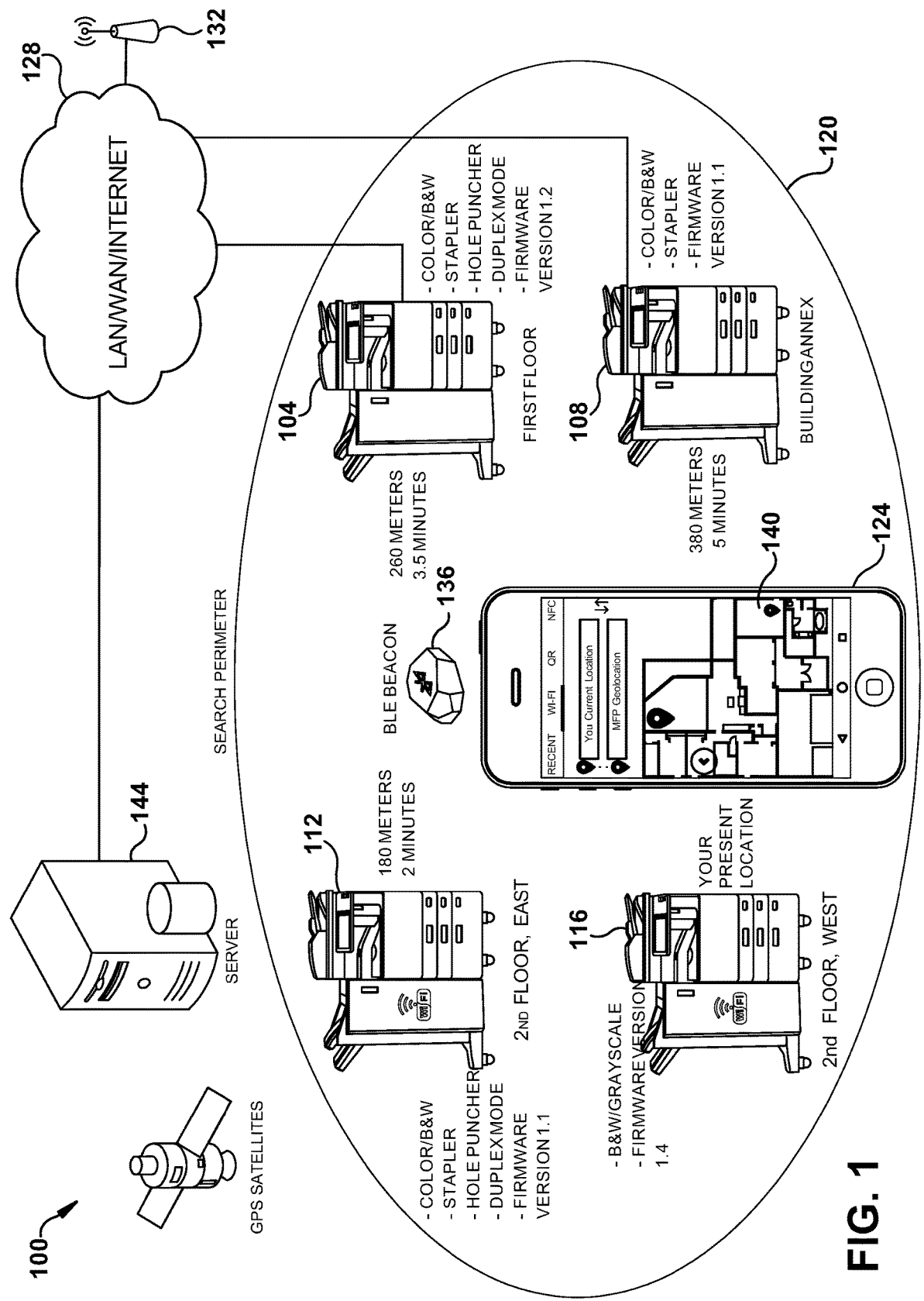
FIG. 1 is an example embodiment of a system for identification and location of user identified, feature specific printers.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

The adoption of mobile devices and apps in a business environment has benefited staffs and faculties tremendously by providing them with flexibility and work portability, allowing them to submit their jobs from anywhere with network connection. Users are can process and manage their documents with MFP service using applications from their mobile device, such as smartphones and tablet computers. The user may be required to know an MFP's address, such as its IP address, functionalities and location in order to use its capabilities. However, users may not be aware of a device's capabilities, and knowing a device's address is of no help to a user who may not know where an MFP is physically located.

Portable data devices may use a suitable MFP interface system to interact with devices in their network. An example is with installation of an e-BRIDGE Print & Capture app by Toshiba TEC. Devices so configured allow users to output data easily from mobile devices and from files stored in the cloud. When there's a sudden need to output a document, as on a business trip, users can get it right away. Data scanned by an MFP can be downloaded to a mobile device or uploaded to the cloud for easy data sharing.

In addition to the forgoing, it would be advantageous to enable user to search for specific printer's capabilities in the network, such as firmware, model, functionalities, distance, and the like rather than just provide the user with a list of nearby printers by IP address or name. Users may wish to only discover printers with specific properties in accordance with their print requirements. In addition, when the user finds the IP address, they cannot determine the location of the MFP. The user may be able to connect to the device, but cannot determine the location to which their job is physically being sent. This can cause problems when the user has no prior knowledge of the MFP's location, such as with a new employee or a visitor, or when an IP address of the MFP changes.

Example embodiments herein teach a dynamic search for printers' capabilities that allows the user to input keywords or phrases when trying to locate specific printers nearby which meet their needs. When the user is returned with the list of nearby printers, each printer's proximity is displayed. With a user selection, such as by clicking on a "GO" button, a map application is launched. The map application uses the printer's geo location queried from the printer as the destination coordinate, commencing at a current location of the user's device.

In accordance with the subject application, FIG. 1 illustrates an example embodiment of a system 100 for identification and location of user identified, feature specific printers, such as MFPs. The example illustrates MFPs 104, 108, 112 and 116, all of which are with a device search perimeter 120 associated with portable user device 124, illustrated as a smartphone. Device in the illustration are in mutual data communication via network cloud 128, suitably comprised of any wireless or wired network, such as a local area network (LAN), a wide area network (WAN) which may comprise the Internet, or any suitable combination thereof. Example wireless data exchange is via Wi-Fi, such as with access point 132.

Devices of FIG. 1 are associated with a location. The MFPs, for example, may be supplied with location information when they are installed. MFPs generally operate from a fixed location once installed, so this information would be static until such time a device may be relocated. Positioning information may also be determined for MFPs by any suitable positioning system, such by use of the Global Positioning System (GPS). Positioning outside of the reach of a GPS beacon may be done by a suitable indoor positioning system such as Wi-Fi positioning, for example when a device connects to one or more Wi-Fi access points or hotspots having known locations. In such situations, further location information can determined by relative signal strength of a Wi-Fi connection. Indoor position information may also be obtained by use of beacon information other than GPS. For example, Bluetooth Low Energy (BLE) beacons, such as BLE beacon 136, can be positioned in known locations on a premises and broadcast their position information. Unlike statically placed MFPs, the position of a smartphone 124 is transient. Accordingly, determination of its position is suitably accomplished wirelessly, such as with the examples detailed above.

Also illustrated in FIG. 1 is touchscreen input display 140 of smartphone 124. As will be detailed further below, such a device user interface is suitably used to secure a user's printer capability requirements to list one or more devices in their corresponding search perimeter that meet those needs. In the example, MFPs have different capabilities, such as different finishing options, such as color, hole punching, stapling, duplexing, or the like. A user may wish to isolate a subset of compatible MFPs to those having specified software or firmware, including software versions. Display 140 provides indicia as to available MFPs, along with a distance or duration to be reached by the smartphone user. Calculated distance can generate an approximate time to walk from an original position of a user device to a selected MFP. Although walking speeds can vary greatly depending on many factors such as height, weight, age, terrain, surface, load, culture, effort, and fitness, it has been found, for example, that the average human walking speed is about 5.0 kilometers per hour (km/h), or about 1.4 meters per second (m/s), or about 3.1 miles per hour (mph). Other factors that can influence a user's MFP selection decision include whether the user chooses to remain in a current building or on a current floor. Time to ascend or descend staircases, or average elevator wait/transport times can also be factored in.

When a user makes a selection of an MFP from the listed subset, the system provides map information, suitably showing the selected device location and routing to get there. In the example of FIG. 1, data storage and calculations to accomplish the forgoing are suitably accomplished on one or more MFPs, the user device, or a network server, such as server 144.

Figure 2:
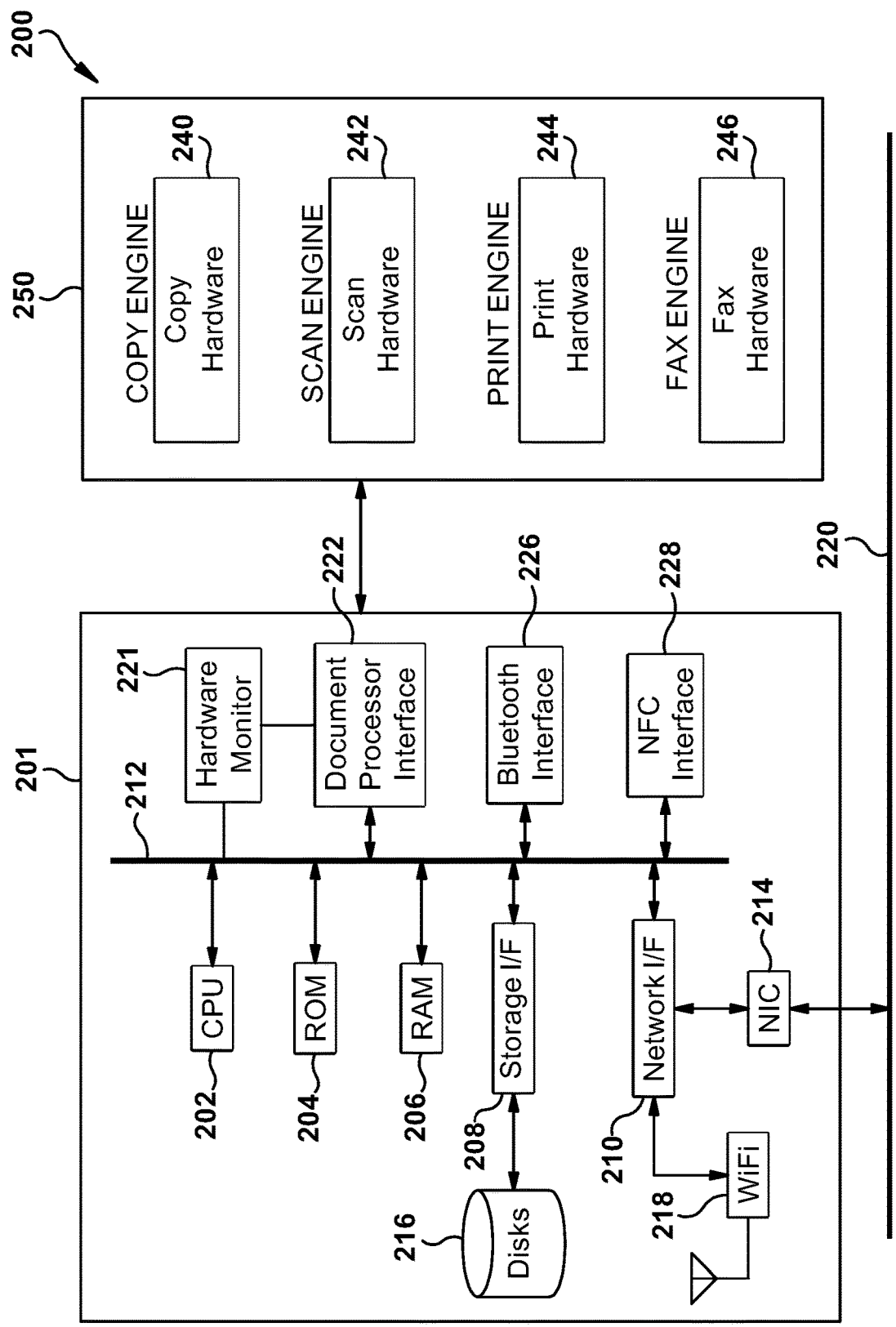
FIG. 2 is an example embodiment of a networked digital device such as a multifunction peripheral.

Turning now to FIG. 2 illustrated is an example embodiment of a networked digital device comprised of document rendering system 200 suitably comprised within an MFP, such as with MFPs 104, 108, 112 and 116 of FIG. 1. It will be appreciated that an MFP includes an intelligent controller 201 which is itself a computer system. Included in controller 201 are one or more processors, such as that illustrated by processor 202. Each processor is suitably associated with non-volatile memory, such as read only memory (ROM) 204, and random access memory (RAM) 206, via a data bus 212.

Processor 202 is also in data communication with a storage interface 208 for reading or writing data with storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via a wireless network interface, such as WiFi 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. Wireless connection information is suitably used for a determination of location as noted above. Processor 202 is also in data communication with a hardware monitor 221, suitably amassing state data from subassemblies, sensors, digital thermometers, or the like, and suitably including digital state date including device codes, such as device error codes. Processor 202 can also be in data communication a document processor interface 222, with Bluetooth interface 226 and NFC interface 228 via data path 212. Bluetooth interface 226 suitably comprises a data interface from a BLE beacon for location determination as noted above.

Processor 202 can also be in data communication with any suitable user input/output (I/O) interface (not shown) which provides data communication with user peripherals, such as displays, keyboards, mice, track balls, touch screens, or the like.

Document processor interface 222 is suitable for data communication with MFP functional units 250. In the illustrate example, these units include a copy engine, suitably comprised of copy hardware 240, a scan engine, suitably comprised of scan hardware 242, a print engine, suitably comprised of print hardware 244 and a fax engine, suitably comprised of fax hardware 246. These subsystems together comprise MFP functional hardware 250. It will be understood that functional units are suitably comprised of intelligent units, including any suitable hardware or software platform.

Figure 3:
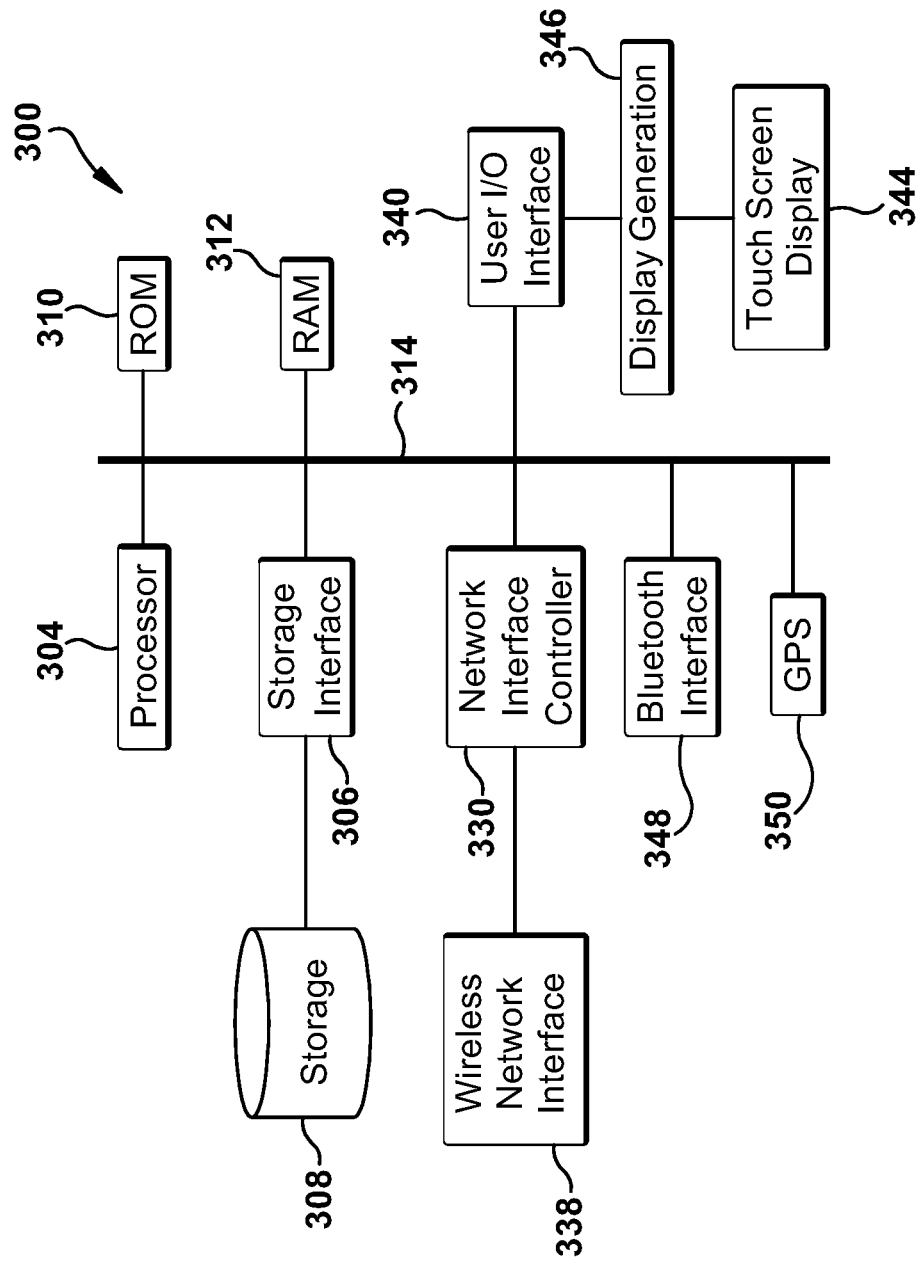
FIG. 3 is an example embodiment of a portable user device such as a smartphone or tablet computer.

Turning now to FIG. 3, illustrated is an example of a digital device system 300 suitably comprising smartphone 124 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable network or device connection, such as a suitable wireless data connection via wireless network interface 338. A suitable data connection to an MFP or server is via a data network, such as a local area network (LAN), a wide area network (WAN), which may comprise the Internet, or any suitable combination thereof. A digital data connection is also suitably directly with an MFP or server, such as via Bluetooth, optical data transfer, Wi-Fi direct, or the like.

Processor 304 is also in data communication with a user input/output (I/O) interface 340 which provides data communication with user peripherals, such as touch screen display 344 via display generator 346, as well as keyboards, mice, track balls, touch screens, or the like. It will be understood that functional units are suitably comprised of intelligent units, including any suitable hardware or software platform. Processor 304 is also in data communication with Bluetooth Interface 348 and GPS interface 350, one or both being usable for location determination as noted above.

Figure 4:
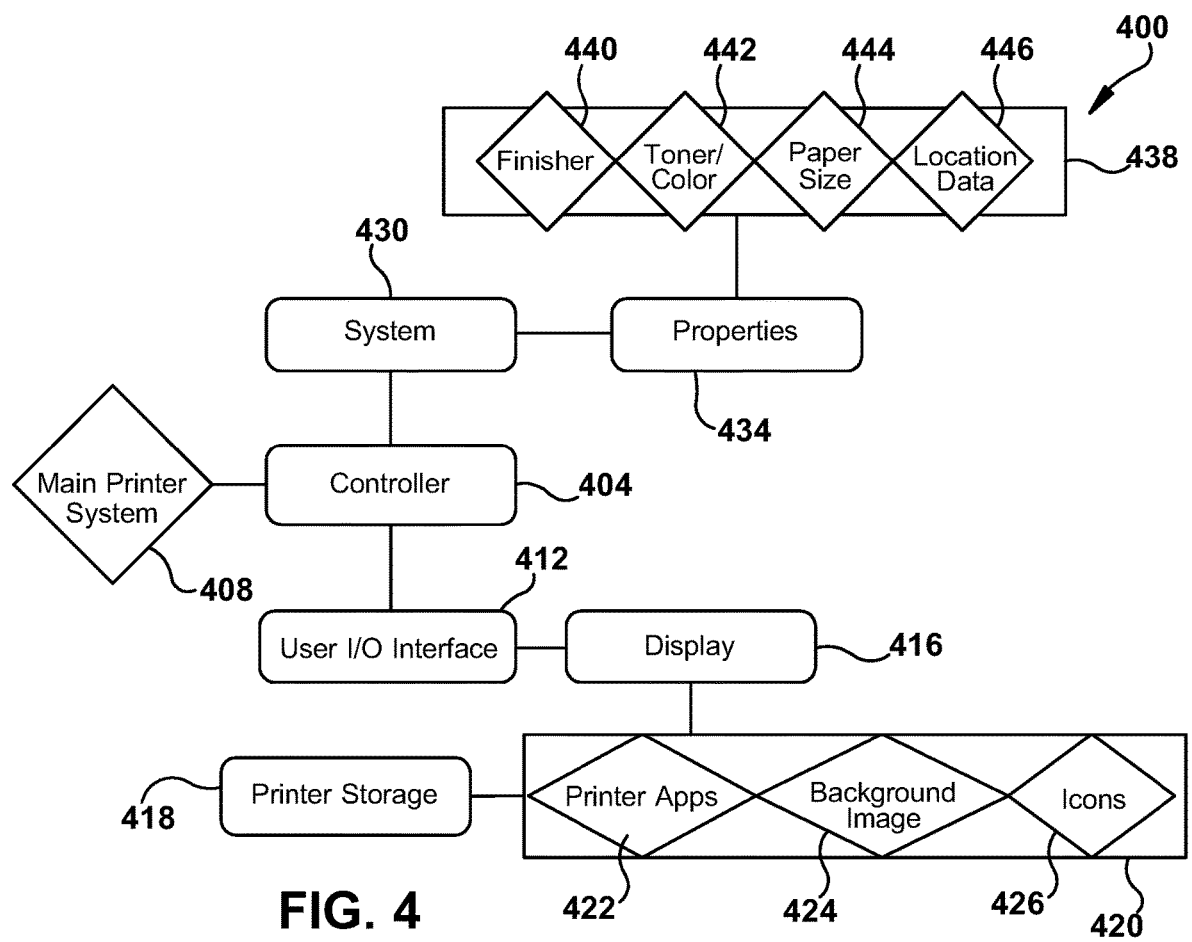
FIG. 4 is a hardware block diagram of example embodiment of an MFP used in connection identification and location of user identified, feature specific printers.

FIG. 4 is a hardware block diagram 400 of an MFP used in connection identification and location of user identified, feature specific printers. Controller 404 interfaces with printing system 408, as well as user I/O interface 412. I/O interface 412, in turn, interacts with a user interface including display 416. Display elements 420 include display output from printer applications 422, background images 424 and icons 426 which are suitably stored in printer storage 418. Also in data communication with controller 404 is a document finishing system 430 which includes printer properties, such as document rendering properties 438. In the illustrated example, these include finisher properties 440, such as collating, stapling or hole punching, toner color properties 442, paper size properties 444 and location data 446. Document rendering properties are suitably selectable by users via their portable data devices.

Figure 5:
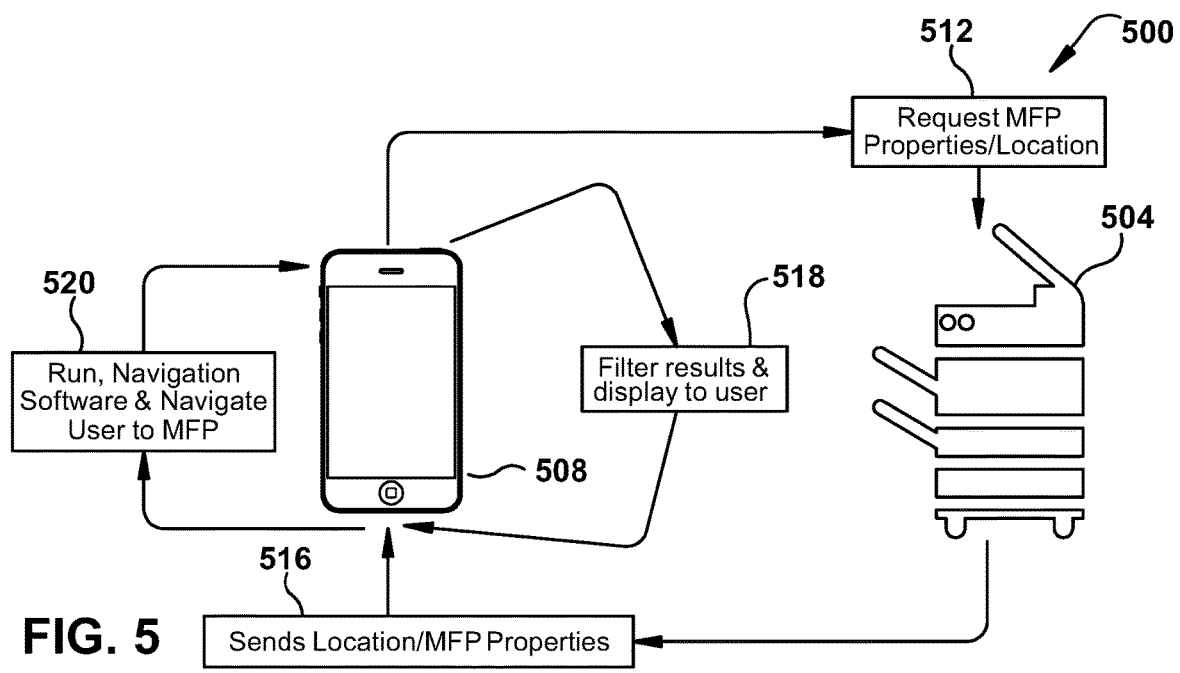
FIG. 5 is an example embodiment of communication flow between a multifunction peripheral and a portable user data device.

FIG. 5 illustrates an example embodiment of communication flow 500 between MFP 504 and portable user data device 508, such as a smartphone or tablet computer. Data device 508 requests location information from MFP 504 at block 512. MFP 504 responds by supplying the device with its location data at block 516. Device 508 obtains user device needs, filters for compatible MFPs and displays results to a user at block 518. Navigation software is used to guide the user to a selected MFP at block 520.

Figure 6:
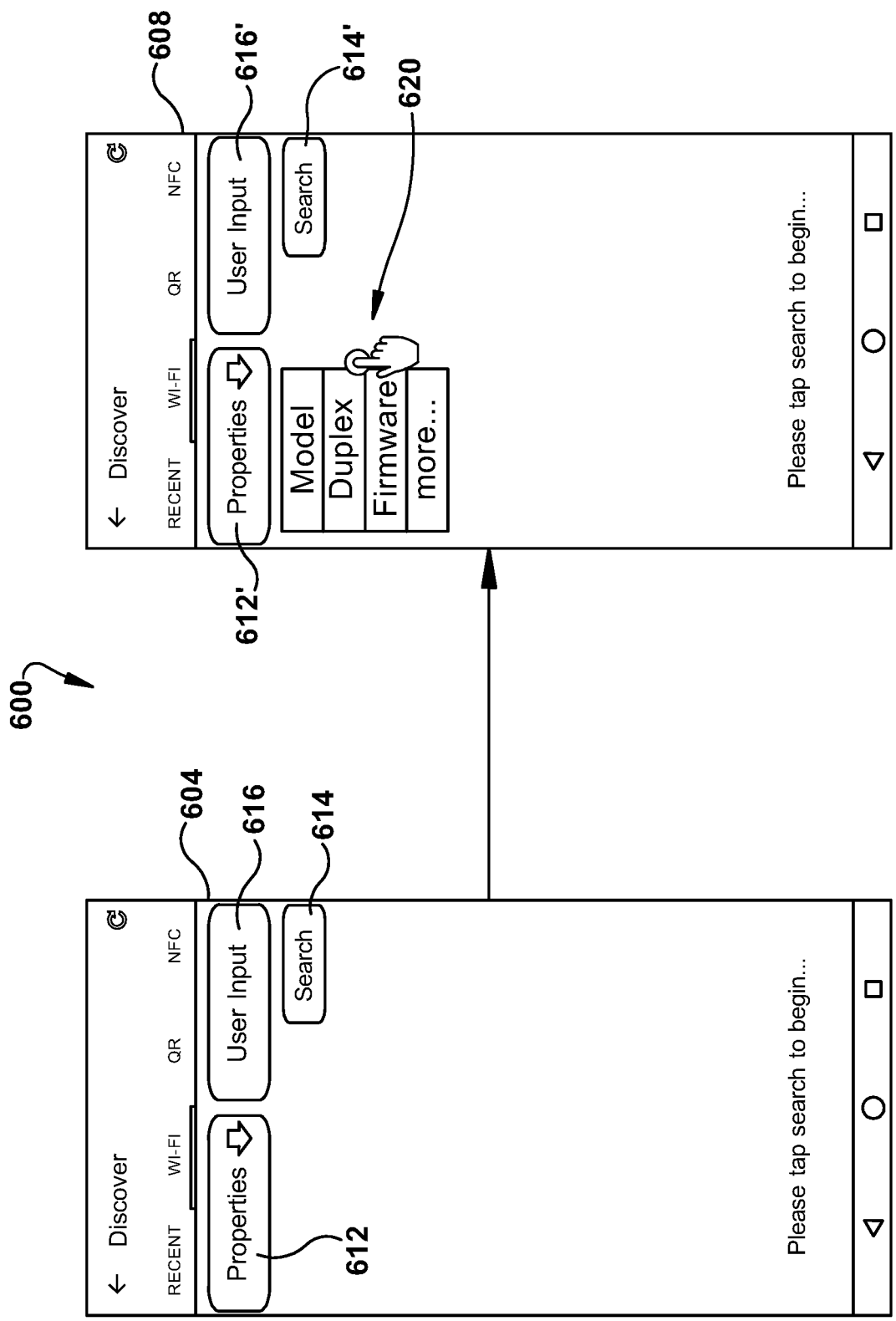
FIG. 6 is a first example embodiment of a user touchscreen device display sequence for a mobile app printing device search.

FIG. 6 illustrates an example embodiment of a user touchscreen device display sequence 600 for a mobile app device search. Display 604 illustrates device discovery mode wherein desired device properties may be input by selection of button 612 or other user search criteria entered by selection button 616. In the example, button 612 is selected and search button 614 is then selected, resulting in generation of display 608 showing selectable printer properties 620. In this particular example, after selection of button 612' and search button 614' the user is given a drop down option of printer capabilities such as COLOR MODE, TONER MODE, DUPLEX, DISTANCE, along with an option to display more options. For each drop down option, the user can enter specific keywords or phrases associated with each option using selection button 616'.

Figure 7:
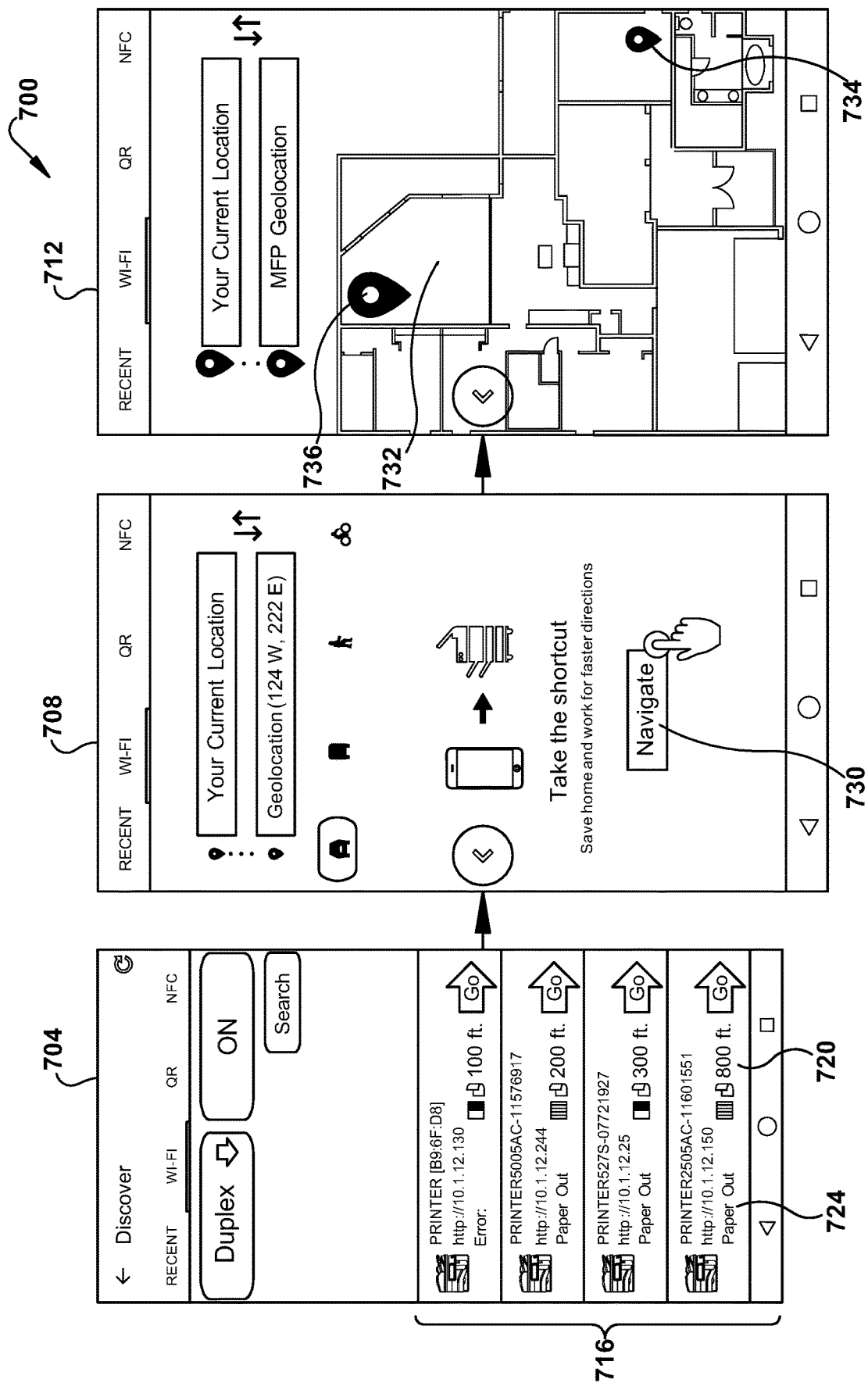
FIG. 7 is a second example embodiment of a user touchscreen device display sequence for a mobile app printing device search.

FIG. 7 illustrates a user device display sequence 700, suitably following user selections made in connection with FIG. 6. The sequence includes screens 704, 708 and 712. Screen 704 displays a subset of MFPs 716 that satisfy the user's requirements. MFPs in the subset are displayed associatively with distances from the user, such as distance 720. Also suitably displayed is associated status information, such as paper out notification 724. When the user selects an MFP from display 704, screen 708 is generated showing that their job is being sent to their selected device. If the user desires navigation assistance to find their selected device, they may select navigation button 730 which then causes generation of screen 712. Screen 712, generated with any suitable software, such as Google Maps, Apple Maps, or other mapping software. In screen 712, the user is also shown graphically their location 734 and their selected MFP location 736 on a map 732.

Figure 8:
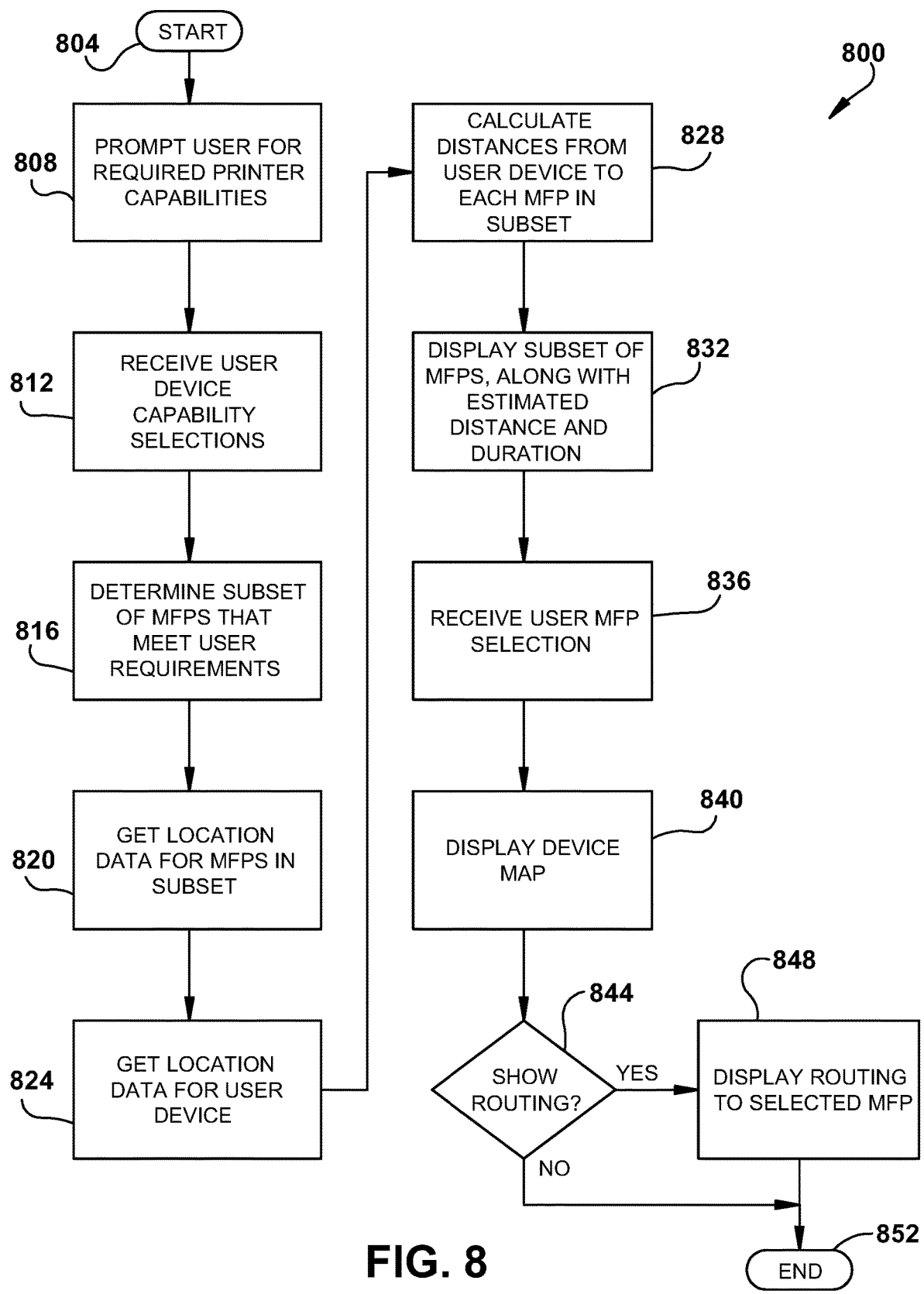
FIG. 8 is a flowchart of an example embodiment of an identification and location of user identified, feature specific MFPs.

FIG. 8 is a flowchart 800 of an example embodiment of operations of a system for identification and location of user identified, feature specific MFPs. The process commences at block 804 and proceeds to block 808 where a user is prompted on their device to enter their printer requirements. These are entered at block 812, and a subset of MFPs that meet the user requirements is generated at block 816. Location information for MFPs in the subset is obtained at block 820, and a location of the user device is obtained at block 824. Distances between the user device and MFPs of the subset is calculated at block 828, and this information is displayed associatively with the subset of MFPs, along with an estimated duration for the user to get to each MFP at block 832. A user selection from the displayed subset is received at block 836 and a map generated and displayed at block 840. If the user elects to receive routing to the selected MFP at block 844, routing is displayed at block 848 before the process ends at block 852. If no routing is requested at block 844, the process proceeds directly to end block 852.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:
1. A system comprising:
a data interface configured to receive, from each of a plurality of MFPs, MFP location data corresponding to its current location;
the data interface further configured to receive, from each of the plurality of MFPs, device state data, the device state data including data identifying current device errors and installed device software;
a processor configured to determine a current location of a digital user device in accordance with beacon data received via a beacon interface;
the processor further configured to generate user device location data corresponding to a determined location;
the processor further configured to show, on a display, a list of MFP device capabilities;
the processor further configured to receive, via a user interface, a user selected subset of the MFP device capabilities;
memory storing data, the memory further storing the user device location data, and for each of the plurality of MFPs,
the MFP location data,
the device state data, and
device data corresponding to its associated device properties;
the user interface including a user input and a display; and
a processor,
the processor configured to receive user selected device properties in accordance with selection of desire MFP device capabilities from the list of MFP device capabilities received via the user interface, the processor further configured to identify a subset of the plurality of MFPs having the user selected device properties, the processor further configured to determine a relative location of each of the subset of the plurality of MFPs to the current location of the digital user device, the processor further configured to generate distance data corresponding to a distance between the portable data device and each of the subset of the plurality of MFPs, and the processor further configured to generate a display corresponding to an identified subset of MFPs contemporaneously with associated distance data, active device errors specified by the device state data, and installed device software.

2. The system of claim 1 wherein the properties of the plurality of MFPs include MFP document finishing capabilities.

3. The system of claim 2 wherein the document finishing capabilities include one or more of duplex printing, stapling, hole punching or color capabilities.

4. The system of claim 1 wherein the processor is further configured to receive the MFP location data from each of the plurality of MFPs.

5. The system of claim 1 wherein the processor is further configured to receive a user selected MFP from the subset of MFPs via the user input and generate a display map on the display corresponding to both the current location of the digital user device and location of the user selected MFP.

6. The system of claim 5 wherein the distance data is comprised of an estimated time to walk to the user selected MFP from the current location of the digital user device.

7. The system of claim 6 wherein the display map includes directions from the current location of the digital user device to the location of the user selected MFP.

8. The system of claim 7 wherein the current location of the digital user device is determined via an indoor positioning system.

9. A method comprising:
receiving into a memory, from each of a plurality of MFPs, MFP location data corresponding to its current location via a data interface;
receiving beacon data via a beacon data interface;
determining, via a processor, a current location of a digital user device in accordance received beacon data;
generating user device location data corresponding to a determined location;
storing, in the memory, data corresponding to properties of each of a plurality of MFPs;
storing, device state data, the device state data including data defining current device errors and current software, the software including a device firmware version;
storing, the user device location data in the memory;
displaying a list MFP capabilities;
receiving user selected device properties selected from the displayed list via a user interface;
storing, the MFP location data in the memory;
identifying a subset of the plurality of MFPs having the user selected device properties;
determining a relative location of each of the plurality of MFPs to the current location of the digital user device;
generating distance data corresponding to a distance between the portable data device and each of the subset of the plurality of MFPs; and
generating a display corresponding to an identified subset of MFPs contemporaneously with the distance data, identified device errors and current software.

10. The method of claim 9 wherein the properties of the plurality of MFPs include MFP document finishing capabilities.

11. The method of claim 10 wherein the document finishing capabilities include one or more of duplex printing, stapling, hole punching or color capabilities.

12. The method of claim 9 further comprising receiving the MFP location data from each of the plurality of MFPs.

13. The method of claim 9 further comprising receiving a user selected MFP from the subset of MFPs via the user input and generating a display map on the display corresponding to both the current location of the digital user device and location of the user selected MFP.

14. The method of claim 13 wherein the distance data is comprised of an estimated time to walk to the user selected MFP from the current location of the digital user device.

15. The method of claim 14 wherein the display map includes directions from the current location of the digital user device to the location of the user selected MFP.

16. The method of claim 15 further comprising determining the current location of the digital user device via an indoor positioning system.

* * * * *